Aug. 10, 1926.  
J. BRANDWOOD ET AL  
1,595,597  
CONVEYER BAND OR BELT  
Filed Feb. 6, 1923  
2 Sheets-Sheet 1
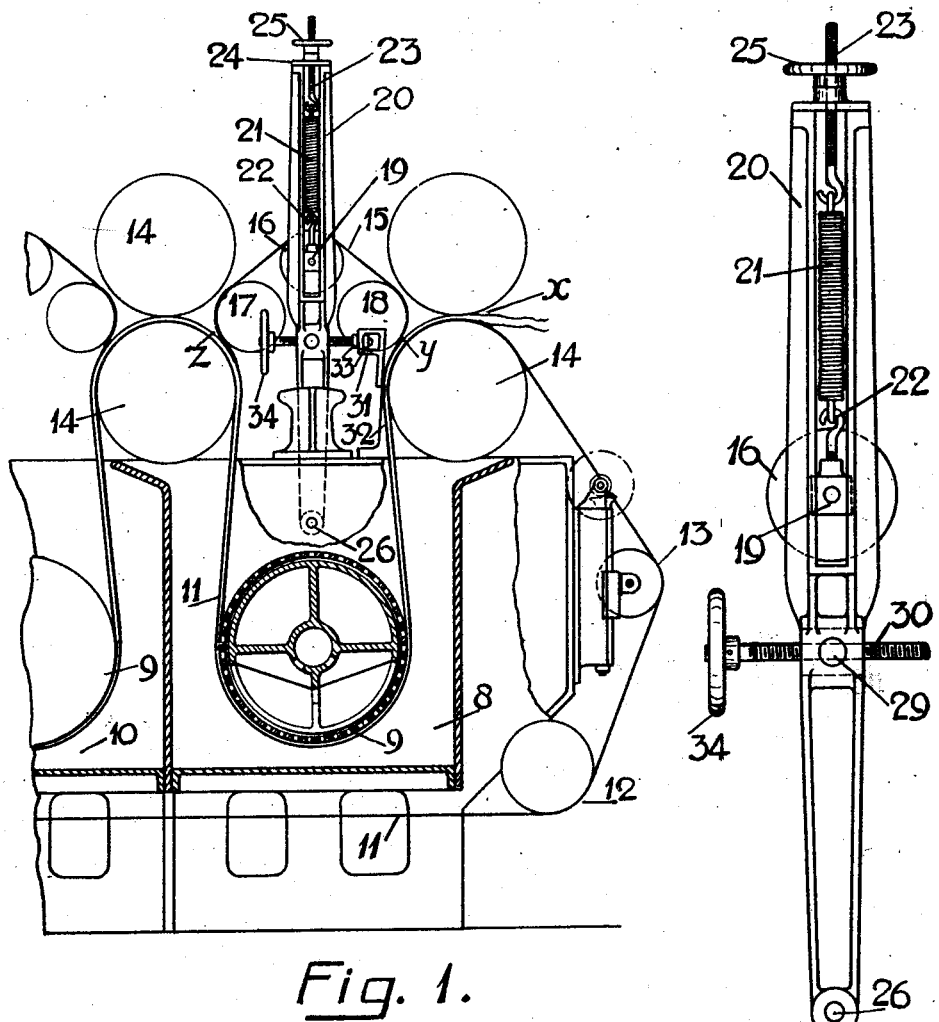
Fig. 1.
Fig. 3.
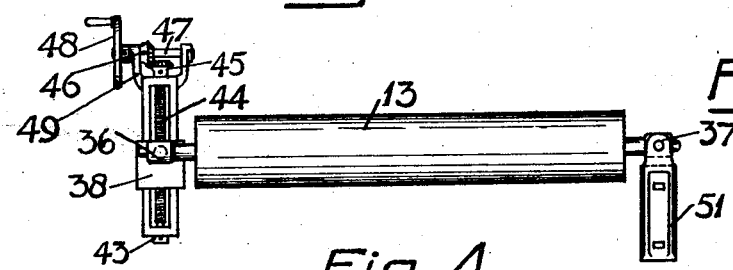
Fig. 4.
Inventors  
John Brandwood  
Thomas Brandwood  
By their Attorney Aug. 10, 1926.  
J. BRANDWOOD ET AL  
CONVEYER BAND OR BELT  
Filed Feb. 6, 1923  
1,595,597  
2 Sheets-Sheet 2

Patented Aug. 10, 1926.

1,595,597

UNITED STATES PATENT OFFICE.

JOHN BRANDWOOD, THOMAS BRANDWOOD, AND JOSEPH BRANDWOOD, OF ELTON, BURY, ENGLAND.

CONVEYER BAND OR BELT.

Application filed February 6, 1923. Serial No. 617,288.

This invention relates to apparatus of an already proposed type wherein material is conveyed to the nip of two endless conveyer bands to traverse the said material, whilst held between the said bands, through the apparatus and around or in contact with rollers or cylinders for the treatment of the material in various ways, as for instance, dyeing, bleaching, scouring, mercerizing, etc. It is absolutely essential in such machines that the conveyer bands shall register as nearly as possible and that one shall not "creep" with reference to the other, the effect of such creeping being that material contained between the bands may be disturbed instead of being tightly held. With two single endless bands however such creeping cannot be avoided, as in passing over guide rollers or cylinders within the apparatus the length of traverse of one band is slightly longer than the other, owing to the thickness of material between them, and the provision of extra guide pulleys to compensate this difference of traverse would be onerous and would lead to the expediture of additional power in traversing the conveyer bands through the apparatus. Also when two endless bands are drawn through the apparatus the strain on both is very great. Further, with such conveyer bands, especially when they have to pass from one treatment tank to another, it is extremely difficult to keep them absolutely straight within the apparatus, and an appreciable deviation from the straight line of traverse of the bands involves the stopping of the machine with possible spoiling of the batch of material being treated.

The object of our present invention is an arrangement of a double conveyer with regulating means which will obviate the disadvantages above pointed out. In carrying it into effect we provide in an apparatus of the type first referred to an endless bottom conveyer band which is sufficiently long to pass through all the tanks of the apparatus—if a plurality of tanks is employed— and return by guide rollers, as known, to the point where the material enters the apparatus. For each tank of the apparatus however we provide a separate top conveyer band so arranged around rollers that it joins the bottom conveyer band at the entrance of the latter to a tank and leaves it at the outlet from said tank, a similar top conveyer provided for the next tank in series coming into juxtaposition with the bottom conveyer in such a manner that the material carried by the bottom conveyer is always securely held between the latter and one of the top conveyer bands and traversed through the treatment tank. The bottom conveyer band passes around guide pulleys one of which is regulatable around one of its bearings so that when desired it may be set at an angle to the line of traverse of the said band, and each top conveyer passes around a similar regulatable roller. Should any conveyer band, therefore, deviate from its direct and straight line of traverse through a tank, adjustment of the regulating rollers may be effected to accelerate or slow down the speed of either longitudinal edge of the band until the deviation is rectified.

The invention will now be fully described with reference to the accompanying drawings, wherein:—

Figure 1 is a side elevation of part of an apparatus such as that described and claimed in the specification accompanying our prior application for British Letters Patent No. 34,576 of 1921, one of the perforated cylinders of such apparatus being shown in section;

Figure 3 is a detailed view to an enlarged scale of part of Figures 1 and 2;

Figure 4 is a detail view to an enlarged scale of an adjustment roller for the bottom conveyer band;

Although for convenience we describe our improvements as applied to an apparatus of the type described in the specification to British application No. 34,576 of 1921 it will be understood that they are equally applicable to any apparatus wherein double conveyer belts are employed to traverse material through treatment apparatus.

Figure 2:
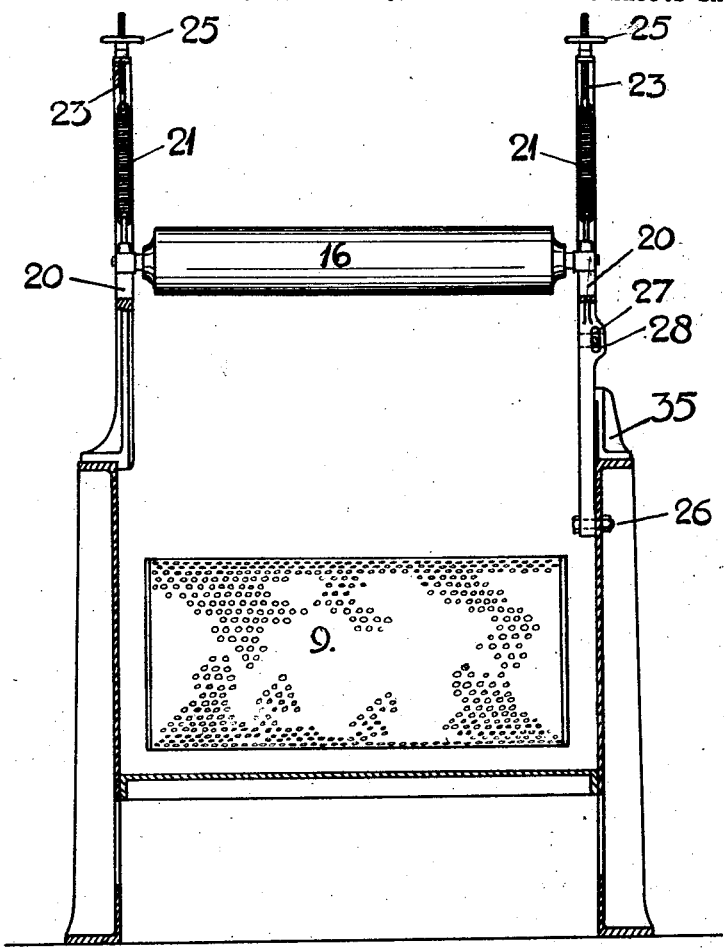
Figure 2 is a view at right angles to Figure 1.
Figure 5:
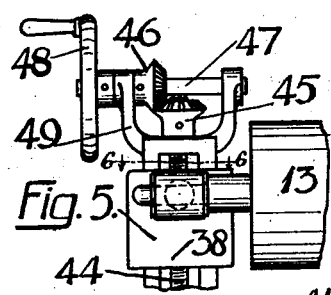
Figures 5 and 6 are details in elevation and sectional plan of part of Figure 4, Figure 6 being taken on line 6—6 of Figure 5.
Figure 8:
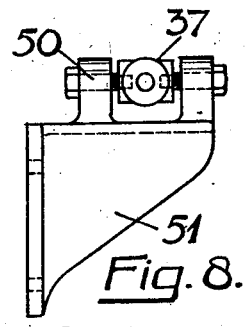

Referring to Figures 1 and 2, 8 is a tank of known construction in which is fitted the perforated cylinder 9. The tank 8 is the first of a plurality of tanks, and 10 indicates part of the next tank thereto in the series.

11 is an endless conveyer band which is shown as proceeding under the tanks 8 and 10, around a guide pulley 12, guide pulley 13 and feed roller 14 and thence around the cylinder 9 in the tank 8. From this tank the conveyer band 11 proceeds between drawing and squeezing rollers 14, 14, into tank 10 and around the perforated cylinder 9 therein, passing thus from one tank to another of the series until, emerging from the last tank, it passes over a guide roller at the other end of the machine, such guide roller being of a similar construction as the roller 12.

15 is a top conveyer band which is endless and which passes around rollers 16, 17, around the cylinder 9 in the tank 8 and around roller 18. It will be seen therefore that material fed to the machine at the point $x$, which is the feeding point of the machine, will pass around the roller 14 for a short distance and enter the nip of the bands 11 and 15 at $y$. The material will then be securely held between the two bands whilst the latter pass around the perforated cylinder 9, dye or other liquor being drawn or forced through the material as indicated in our said prior specification No. 34576 of 1921, the conveyers 11 and 15 ascending to the point $z$. At this latter point the conveyers separate as shown, the bottom conveyer 11 passing onwards, with the material borne thereon, to the nip of the rollers 14, 14 which squeeze the material. The latter, borne on the bottom conveyer band 11, passes onwards to the nip of the said conveyer band 11 and of a second top conveyer band 15 of tank 10, the process as described above being repeated in the said tank. In this manner any number of tanks may be employed, each being provided with a separate endless top conveyer band 15, the one endless bottom conveyer band 11 passing through all of them.

It is essential that the top conveyer band should be kept in a taut condition at all times, and this is effected by the means now to be described. The highest roller 16 of the three around which the conveyer band 15 passes is borne in a sliding bearing block 19 at each side of the tank 8 adapted to slide within the metal frame or cheek 20. The bearing block 19 is supported by a tension spring 21 through the hook 22 and at the other extremity the said spring 21 is attached by hook means to a screwed shank 23 passing through an orifice in the top 24 of side frame 20. A handwheel 25 having a boss tapped for the reception of the end of the screwed shank 23 is provided for the regulation of the spring 21. These parts are identical on each side of the machine, as shown clearly in Figure 2, and the tension of the spring 21 keeping the roller 16 at the highest possible point, the conveyer bands 15 is maintained in a taut condition. Any variation of tension between the springs 21 can be immediately and easily corrected by means of the handwheels 25. Should the top conveyer band 15 at any time during the operation of the apparatus become uneven in its traverse around the rollers 16, 17, 18 as for instance through the slackening of an edge thereof, or through slight unevenness of the layer of material contained between itself and the bottom conveyer 11, one of the side frame or cheeks 20 may be adjusted laterally to place the roller 16 at an angle to the direction of traverse of the conveyer whilst the latter is travelling to correct the fault and again set the said conveyer in its proper working position. To this end—referring to Figures 1, 2 and 3—one only of the side frames is pivoted upon a bearing pin 26, and the said side frame is slotted as shown at 27 Figure 2, a pin 28 passing through an orifice in the side frame and transversely to the slot 27, this pin being so secured in any convenient manner that it may be given angular motion. Through a transverse orifice 29 in the pin, which orifice is tapped for the purpose, passes the screwed stem or shank 30, one extremity of which is left plain and is supported within a bearing 31 affixed to a support 32 mounted on the tank 8. A collar 33 may be pinned on the stem 30 to limit the movement thereof. The other and free extremity of the stem 30 bears a handwheel 34. Angular movement may be imparted to the side frame 20 by rotating the handwheel 34 as will be understood, to move the said frame, with its roller bearing 19, to right or left as viewed in Figure 1 of the drawings, the direction of such movement being dictated by the direction of deviation of the conveyer 15 as it is passing over the roller 16. To allow of this movement the bearing 35 of the roller 16 (Figure 2) is formed as a swivel bearing, of any known type. The deviation being corrected, the side frame 20 shown in Figure 1 may be again brought to the vertical position by manipulating the handwheel 34.

It will be understood that each of a plurality of tanks—where there are more than one tank in the apparatus—is provided with a special adjusting roller of the construction just described, for the adjustment of its top conveyer band.

35 is a support for the side frame 20 with which the latter is in sliding contact, this support serving to keep the side frame in a vertical plane.

Figure 6:
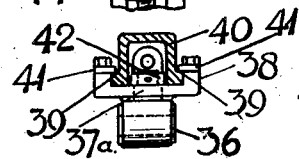
Figure 7:
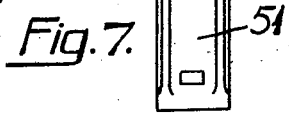
Figures 7 and 8 are side and end elevation respectively of a bearing shown in Figure 4.

The method of adjusting the bottom conveyer or band should it deviate from its straight traverse around its various rollers and cylinders will now be described, with reference to Figure 1, and Figures 4 to 8 of the drawings. 13 is the adjustment guide roller around which the bottom conveyer band 11 passes. It is supported by bearings 36, 37. As shown to enlarged scale in Figures 5 and 6, the bearing 36 is a swivel bearing supported by a block 38 which engages the flanges 39, 39 secured upon a casing 40 of U section bolted to the end of tank 8. The block 38 is kept in position by means of the plates 41, 41, which are bolted to the said block as shown in Figure 6. To secure the neck 37$^a$ of the swivel bearing 37 in position whilst allowing it to move angularly, it is fitted with a collar 42 which may be pinned thereon. Within the casing 40 and supported therein by a step bearing 43, as shown in Figure 4, we provide a screwed shaft 44, bearing at its upper extremity a bevel wheel 45 gearing with a bevel pinion 46 upon a handwheel shaft 47 which is provided with a handwheel 48 and which shaft is supported in the fork bearing 49. The screwed shaft passes through the block 38 which is tapped to receive it. The other bearing 37$^b$ of the roller 13 is a swivel bearing of known type as shown at 32 Figure 4 and in detail in Figures 7 and 8, supported on a bearing bracket 51 bolted to the end plate of the tank 8. On adjustment of the guide roller being necessary for any reason such as those cited with regard to the roller 16, rotation of the handwheel 48 will raise or lower the bearing block 38 by means of the screwed shaft 44 passing therethrough, the bearing 37 and also the bearing 50 adapting themselves to the changed position of the roller.

It is essential that with both methods of roller adjustment as described above, the adjustment roller should be moved around one of its bearings and in a direction which corresponds to the direction of traverse of the machine. Thus, the adjustment of guide roller 16 is lateral; that of the guide roller 13 vertical.

Where the apparatus in which these conveyer bands are employed is intended for the treatment of textile materials with liquors which would have a deleterious effect on ordinary metal, the conveyer bands formed as just described are of nickel or of nickel alloy.

The construction hereinbefore described for the particular purposes set forth are the best known to us, but we do not confine ourselves to the exact details given, which may be modified within wide limits whilst still retaining the spirit of our invention.

We claim:—

1. In apparatus in which endless bands are employed for the holding and traversing of material through a plurality of treatment tanks and around rollers or cylinders within the tanks, a single lower endless conveyer band passing through all the tanks, an upper endless band for each tank, guide rollers for each of the upper conveyer bands, bearings for certain of the guide rollers one of the bearings for each such roller being laterally movable to vary the relation of the roller to the band, guide rollers for the lower conveyer band and screw means for vertically adjusting a guide roller over which such single lower conveyer band passes to alter its relation to the said conveyer band and means for keeping each upper conveyer band in a taut condition.

2. In apparatus having a single bottom conveyer band and a plurality of separate endless top conveyer bands with adjustable rollers as claimed in claim 1, means for laterally adjusting one bearing of a guide roller over which an upper conveyer band passes, such means comprising a side cheek or frame having a bearing in which a neck of the guide roller shaft is journalled, screw means for giving angular motion to such side cheek, and a further fixed side cheek having a swivel bearing in which the other neck of the guide roller shaft is journalled, substantially as hereinbefore set forth.

3. In apparatus as claimed in claim 1, means for vertically adjusting a guide roller over which the bottom endless conveyer band passes, such means comprising swivel bearings in which the necks of the guide roller shaft are journalled, a block supporting one of the said swivel bearings, a screwed shaft passing through and engaging such block, and a handwheel for operating the screw shaft, substantially as hereinbefore set forth.

4. In apparatus as claimed in claim 1, means for keeping the upper conveyer bands in a taut condition, such means comprising a guide roller for each such band, bearings for the shaft necks of such guide roller, such bearings being slidably mounted in side cheeks, and tension springs in such side cheeks and connected to the slidable bearings to exercise a constant pull on the latter, substantially as hereinbefore set forth.

In witness whereof we have hereunto set our hands.

JOHN BRANDWOOD.
THOMAS BRANDWOOD.
JOSEPH BRANDWOOD.